Nov. 17, 1925.
H. F. MIEHER
1,562,034
IMPLEMENT FOR HANDLING BALED MATERIAL
Filed March 19, 1925
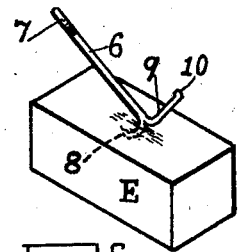
FIG. 6.
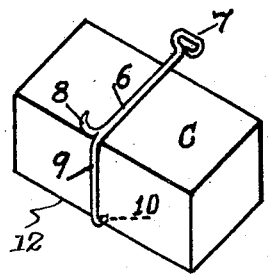
FIG. 4.
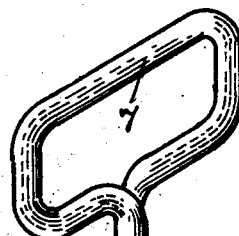
FIG. 5.
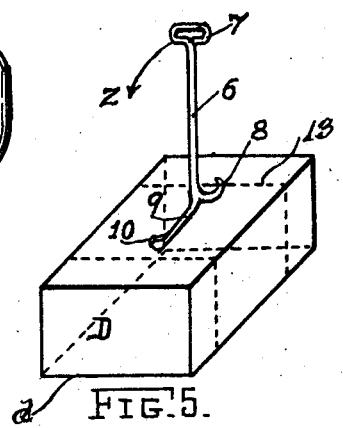
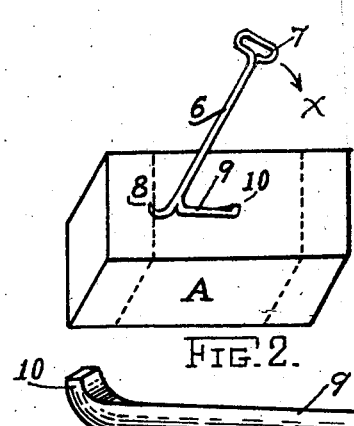
FIG. 2.
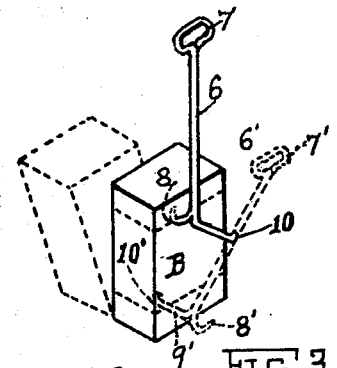
FIG. 3.
FIG. 1.
Witnesses.
John H. Wilks.
John N. Piper
Inventor.
Henry F. Mieher.
By Atty N. DuBois.

Patented Nov. 17, 1925.

1,562,034

UNITED STATES PATENT OFFICE.

HENRY F. MIEHER, OF CARLINVILLE, ILLINOIS.

IMPLEMENT FOR HANDLING BALED MATERIAL.

Application filed March 19, 1925. Serial No. 17,877.

*To all whom it may concern:*

Be it known that I, HENRY F. MIEHER, a citizen of the United States, residing at Carlinville, in the county of Macoupin and State of Illinois, have invented a new and useful Implement for Handling Baled Material, of which the following is a specification.

The invention relates to means for handling baled articles such as hay, rags, cotton, etc. The purposes of the invention are to provide an implement of improved construction adapted to grapple the bales which are to be handled and capable of use in a variety of ways to facilitate the handling of the bales; and to provide an implement of the class described comprising in a single structure a staff, a handle, a hook and a relatively long lever or arm of improved form co-acting in the manner hereinafter described.

The invention is illustrated in the accompanying drawing to which reference is hereby made.

Figure 1, is a perspective view of an implement embodying my invention.

Figs. 2, 3, 4, 5, and 6 are diagrams illustrating various modes of using the implement.

The implement is made of steel and comprises in one piece, a staff 6, a handle 7, a hook 8, preferably of the form shown; and a relatively long lever or arm 9 extending outwardly from the staff 6 approximately at a right angle and having a shoulder 10 offset and tapered upwardly from the body of the arm.

The axes of the staff 6, the hook 8, and the lever or arm 9 are all in the same plane; thus adapting the curved bottom part of the hook to serve as a fulcrum on which the staff 6 turns, thereby increasing greatly the co-operative action of the staff 6 and the arm or lever 9.

Fig. 2 illustrates the use of the implement to up-end a tied bale A, by inserting the hook 8 into the bale A under the tie; taking hold of the handle 7 and pulling the implement in the direction indicated by the arrow X, to cause the heel of the member 10 to bear firmly on the upper surface of the bale to steady the bale, and then continuing the pull on the handle to effect complete up-ending of the bale in an obvious manner.

Fig. 3 illustrates the use of the implement for tilting and dragging a bale B which is too heavy to carry. In this case the user will insert the hook 8 firmly in the bale and pull the handle 7 towards him until the uppermost edge of the end of the bale rests against his body. He will then hold the upper end of the bale with one hand, and with the other hand will detach the implement from the bale and insert the arm 9 under the bale in a position transverse to the lower end of the bale and the shoulder 10 engaged on one lower edge of the bale, as indicated by dotted lines. He will then hold the handle 7 and will push the bale outwardly until it bears against the staff 6 and will steady it on the staff. In this case the heel of the hook 8 serves as a fulcrum on which the staff 6 turns, thereby increasing the leverage; and the terminal lug 10 of the arm 9 prevents slipping of the bale on the arm. When the bale lies in place lengthwise on the staff 6, the user will pull on the handle to drag the bale along on the curved body of the hook.

Fig. 4 shows the implement applied for lifting and carrying a bale C; in this case the shoulder 10 of the arm 9 will be pushed under one lower edge of the lower front edge 12 of the bale so that the arm will rest against the face of the bale. The user will then grasp the handle 7 in one hand and the hook 8 in the other hand and will use both hands in steadying, raising and carrying the bale. This mode of use is of special value in stacking bales in cars, on account of the easy detachment of the shoulder 10 from the lower edge of the bale which lies near a car wall, or near another bale.

Fig. 5 illustrates another use of the implement for lifting, carrying and stacking bales in a warehouse or car. In this mode of use the hook 8 will be pushed securely into the body of the bale D under the usual bale tie 13, and the arm 9 will rest firmly on the upper face of the bale. Upon pulling the handle 7 in the direction Z the bale will be tilted on its lower edge *d* into such a position that the user may hold the handle 7 with one hand and hold the bale with the other hand and may easily lift, carry and stack the bale.

The mode of use illustrated in Fig. 6 consists in pressing the hook 8 securely into the bale, then taking the handle 7 in one hand and the arm 9 in the other hand, and utilizing both hands to steady, lift and carry the bale.

I am aware that hooks of various forms have been used for handling merchandise. I therefore do not claim broadly the use of such hooks, but restrict my claim to the precise construction herein shown and described.

Having fully described my invention what I claim as new and desire to secure by Letters Patent is:

An implement for handling and stacking baled hay or the like, comprising in an integral structure, a staff; a handle at one end of the staff; an upwardly extended and outwardly curved pointed hook; and an arm in the same plane with the staff and the hook and having an offset upwardly extending tapered terminal member adapted for easy insertion under the usual bale-tie, and also adapted to prevent slipping of the load carried on the arm; and also adapted for easy withdrawal of the arm from the edge of the carried bale.

In witness whereof I have hereunto signed my name at Carlinville, Illinois, this 11th day of March, A. D. 1925.

HENRY F. MIEHER.